(12) United States Patent
Wasserman et al.

(10) Patent No.: US 6,677,948 B1
(45) Date of Patent: Jan. 13, 2004

(54) SYSTEMS AND METHODS FOR MULTI-RESOLUTION IMAGE DEFOCUSING

(75) Inventors: Richard M. Wasserman, Redmond, WA (US); Dahai Yu, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/332,603

(22) Filed: Jun. 14, 1999

(51) Int. Cl.$^7$ ............................................. G06T 15/00
(52) U.S. Cl. .................................................. 345/428
(58) Field of Search .............................. 345/428, 419, 345/441, 422, 589, 619; 382/254, 255, 154

(56) References Cited

U.S. PATENT DOCUMENTS

| | | | | |
|---|---|---|---|---|
| 5,307,175 A | * | 4/1994 | Seachman | 358/401 |
| 5,570,433 A | | 10/1996 | Nagamine et al. | |
| 5,986,659 A | * | 11/1999 | Gallery et al. | 345/419 |
| 6,157,387 A | * | 12/2000 | Kotani | 345/589 |
| 6,229,913 B1 | * | 5/2001 | Nayar et al. | 382/154 |

OTHER PUBLICATIONS

"Synthetic Image Generation with a Lens and Aperture Camera Model", by Michael Potmesil et al., ACM Transactions on Graphics, vol. 1, No. 2, pp. 85–108, Apr. 1982.
"A Lens and Aperture Camera Model For Synthetic Image Generation", by Michael Potmesil, et al., Computer Graphics, vol. 15, No. 3, pp. 297–305, Aug. 1981.
"Distributed Ray Tracing", by Robert L. Cook et al., Computer Graphics, vol. 18, No. 3, pp. 137–145, Jul. 1984.
"Importance Ordering for Real–Time Depth of Field", by Paul Fearing, Proceedings of the 3$^{rd}$ International Confernece on Computer Science, pp. 372–380, 1996.
"Generating Depth–of–Field Effects in Virtual Reality Applications", by Przemyslaw Rokita, Computer Graphics, vol. 16, No. 2, pp. 18–21, Mar. 1996.
"Fast Generation of Depth of Field Effects in Computer Graphics", By Przemyslaw Rokita, Computers & Graphics, vol. 17, No. 5, pp. 593–595, Sep./Oct. 1993.
"Post–Filtering for Depth of Field Simulation with Ray Distribution Buffer", by Mikio Shinya, Graphics Interface '94, pp. 59–66.
*OpenGL Programming Guide*, Second Edition, Addison–Wesley Developers Press, pp. 402–406.
A. Glassner, *Principles of Digital Images Synthesis*, vol. 2, pp. 1013–1023, Morgan Kaufmann Publishers, Inc., 1995.
"A Realistic Camera Model for Computer Graphics", by Craig Kolb et al., Computer Graphics, Proceedings of SIGGRAPH '95, ACM SIGGRAPH, pp. 317–324, 1995.

* cited by examiner

*Primary Examiner*—Kee M. Tung
*Assistant Examiner*—Huedung X. Cao
(74) *Attorney, Agent, or Firm*—Oliff & Berridge, PLC

(57) ABSTRACT

The defocused image generating methods and systems defocus an image using sets of image elements of a multi-resolution pyramid representation of the input image. Each pixel in the original image generates a region of confusion based on the image depth data for that pixel. The sets of image elements are used to represent the region of confusion using increasingly higher resolution image elements. The final defocused image is generated by compositing or combining together the sets of image elements after the region of confusion of each pixel has been decomposed into the sets of image elements.

40 Claims, 8 Drawing Sheets

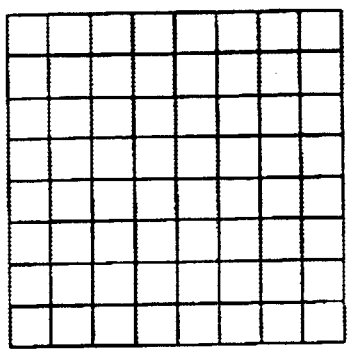
K = 0
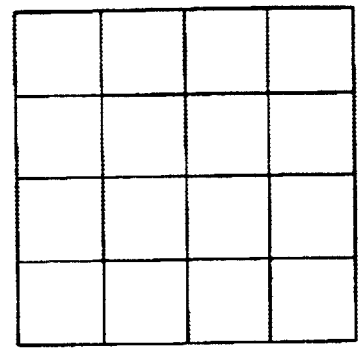
K = 1
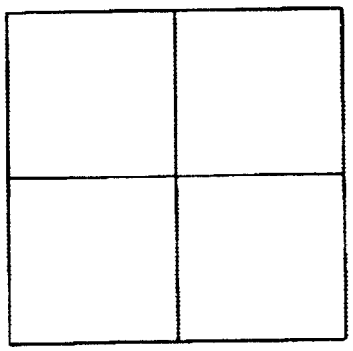
K = 2
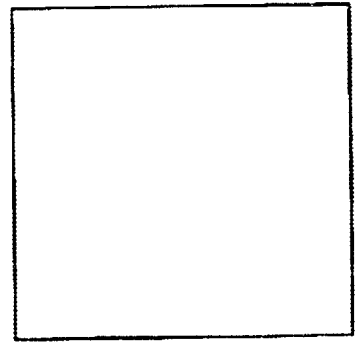
K = 3
FIG. 1

+

+

+

=

If the counter variable is equal to zero then execute the following operation:
for (i = ll $X_k$; i < lr$X_k$; i=i + $n_k$)
{
    for (j=ll$Y_k$; j < ul$Y_{k-1}$); j = j + $n_k$)
    {
        Fill Pyramid Element (i,j,k)
        Increment Counter Variable.
    }
}
otherwise
for (i = ll$X_k$; i < lr$X_k$; i = i + $n_k$)
{
    for (j = ll$Y_k$; j < ll$Y_{k-1}$); j = j + $n_k$)
    {
        Fill Pyramid Element (i,j,k)
        Increment Counter Variable.
    } for (j = ul$j_{k-1}$ + $n_{k-1}$; j < ul$Y_k$; j = j + $n_k$)
    {
        Fill Pyramid Element (i,j,k)
        Increment Counter Variable.
    }
} for (j = ll$Y_{k-1}$; y < ul$Y_{k-1}$ + $n_{k-1}$; j = j + $n_k$)
{
    for (i = ll$X_k$; i < ll$X_{k-1}$; i = i + $n_k$)
    {
        Fill Pyramid Element (i,j,k)
        Increment Counter Variable.
    }
    for (i = lr$X_{k-1}$ + $n_{k-1}$; i < lr$X_k$; i = i + $n_k$)
    {
        Fill Pyramid Element (i,j,k)
        Increment Counter Variable.
    }
}

FIG. 6

SYSTEMS AND METHODS FOR MULTI-RESOLUTION IMAGE DEFOCUSING

BACKGROUND OF THE INVENTION

1. Field of Invention

This invention is directed to defocusing a simulated image. More particularly, this invention is directed to simulating defocusing in synthetic images using multiple resolutions.

2. Description of Related Art

Depths of focus calculations are rarely performed in real-time graphics applications even though they can be quite valuable. This occurs because the computational cost of a depth of focus calculation can be exceedingly high. Conventionally, a single defocused frame can take several minutes to generate. To make matters worse, simple depth of focus control usually requires a long sequence of related frames.

"A Lens and Aperture Camera Model for Synthetic Image Generation", Potmesil et al, Computer Graphics, ACM Press (1981) describes a method for simulating depth of field effects caused by a lens and aperture in a computer graphics system. The method is a two-pass post-filtering process. The first pass computes an image and a corresponding z-depth map. The second pass computes depth of field effects to generate a defocused image.

Given the color of each pixel and its distance from the camera plane, the size of the image, the position of each pixel and an illumination distribution, a circle of confusion may be computed for each pixel. The circle of confusion of a pixel defines how that pixel will contribute to the output image. A defocused image is then generated by calculating the size and properties of the circle of confusion formed by each input pixel and combining the contribution of each circle of confusion to form the defocused image. In other words, the intensity of a pixel in the defocused image is determined by summing the intensity distributions of overlapping circles of confusion for each pixel in the original image.

There are three key steps that are repeated for each input pixel according to Potmesil's method. These three steps occur after a rendering engine has produced a two-dimensional image and a z depth map from a camera viewpoint. The first step includes determining the radius of a circle of confusion for a pixel. This radius is determined using the distance of the pixel from the camera and the optical parameters of the camera system that is being modeled using the following equation:

$$r = |V_u - V_p| \frac{F}{nV_u} \quad (1)$$

where:
r is the radius of the circle of confusion;
$V_p$ is the distance from the image plane to a lens element;
$V_u$ is the image distance;
F is the focal length; and
n is the aperture number.

The second step determines the illumination distribution within the determined circle of confusion given the color values of the original pixel. Potmesil discloses using pre-calculated lookup tables to reduce the processing cost of this operation. Lastly, Potmesil combines the illumination distribution information for each circle of confusion that overlaps each pixel into an output image in accordance with the following formula:

$$Q(X, X+\Delta X), (Y, Y+\Delta Y) = \frac{\sum_{p=1}^{A} \frac{f(x_p, y_p, z_p) q_p}{z_p^2}}{\sum_{p=1}^{A} \frac{f(x_p, y_p, z_p)}{z_p^2}} \quad (2)$$

where:
Q is the final intensity at pixel area (X,X+ΔX)(Y,Y+ΔY);
A is the number of point samples in the image;
$q_p$ is the intensity of point sample p;
$X_p$ is the x coordinate of the sample pixel p in the image plane;
$y_p$ is the y coordinate of the sample pixel p in the image plane; and
$z_p$ is the z depth of the sample pixel p; and $$f(x_p, y_p, z_p) = \int_x^{x+\Delta x} \int_y^{y+\Delta y} I\left(z_p, \sqrt{(x-x_p)^2 + (y-y_p)^2}\right) dy\, dx \quad (3)$$

where I is an intensity-distribution function, and with the condition that:

$$\int_{-\infty}^{\infty} \int_{-\infty}^{\infty} I\left(z_p, \sqrt{(x-x_p)^2 + (y-y_p)^2}\right) dy\, dx = 1. \quad (4)$$

Potmesil also simulates diffraction effects of lenses by modifying the intensity distribution across the circle of confusion. If a flat intensity distribution model for each circle of confusion is assumed, then the contribution of out of focus pixels can be considered low-resolution details in the final image. The radius of the circle of confusion determines how low the resolution of each contribution is. The traditional computational expense for combining the contributions of each pixel, using standard hardware, is proportional to the square of the radius of the circle of confusion.

In Potmesil's method, the complexity of the processing increases exponentially as the radius of the circle of confusion of each pixel increases. As an image becomes increasingly defocused, the circle of confusion of each pixel increases. As a significant number of pixels become out of focus, the processing time for each frame increases rapidly. Therefore, Potmesil's method can be extremely slow for significantly defocused images.

Some recent work has sought to address this problem by performing importance-based rendering only on pixels that are modified, while exploiting interframe coherence. "Importance Ordering for Real-Time Depth of Field," P. Fearing, Proceedings of the 3rd International Conference on Computer Science, pp. 372–380, 1996, teaches ranking the pixels according to the degree of change in defocus and/or distance. The ranking is then used to prioritize the pixels. Only those pixels with a change above a threshold are modified. The pixels are then modified according to their ranked order of importance and the available processing resources. However, processing times for the first frame after the coherence is lost can still be significant.

Humans focus cameras by trial and error, i.e., experimentation. A human points a camera at a subject and manually changes the focus until a desired affect is achieved. Because focusing calculations take such a long time, defocus experimentation using computer generated images has been impractical.

SUMMARY OF THE INVENTION

If defocusing computations were fast enough to allow near real time computation of sequences of related frames, rendering systems could allow trial and error adjusting of focusing affects.

The systems and methods of this invention improve upon Potmesil's method by combining an area of confusion generated for each pixel using a multi-resolution method.

The systems and methods of this invention improve upon the system and method taught in Potmesil by simplifying the determination of the contribution of each pixel in the input image to the output image.

The systems and methods of this invention determine a region of confusion for each pixel, and a plurality of sets of image elements. Each set of image elements has a different resolution. The systems and methods of this invention then determine the contribution of the pixel to each element in the sets of image elements. The region of confusion includes the contributions from the sets of image elements.

In an exemplary embodiment of the systems and methods of this invention, the area of the region of confusion of each pixel is decomposed into a set of image elements on a pyramidal basis. Given the specific region of confusion for a given pixel, it is possible to compute a minimal and complete representation in a pyramid basis. A complete representation is one in which the basis elements are set in the pyramid structure such that when an image is reconstructed, the exact illumination and extent of the original signal is reproduced. A minimal representation is one in which the pyramid elements used to reproduce a signal are chosen so as to modify as few elements as possible.

The systems and methods of this invention exploit the fact that it is more efficient to fill large low-resolution areas in a multi-resolution structure than it is to fill low-resolution areas in an original high-resolution image. The systems and methods of this invention couple the efficient decomposition of each region of confusion into a multi-resolution representation to achieve significant increases in processing speeds in post-processing-based defocus effects.

These and other features and advantages of this invention are described in or are apparent from the following detailed description of various exemplary embodiments.

BRIEF DESCRIPTION OF THE DRAWINGS

Various exemplary embodiments of this invention will be described in detail, with reference the following figures, wherein:

FIG. 1 shows an exemplary multi-resolution pyramid structure which can be used as an alternate representation of an 8×8 image;

FIG. 6 is a pseudo-code listing outlining an algorithm using one exemplary embodiment of the systems and methods for generating a defocused image according to this invention.

DETAILED DESCRIPTION OF EXEMPLARY EMBODIMENTS

FIG. 1 shows four sets of image elements of the pyramid representation used by the defocused image generating systems and methods of this invention. These four sets of image elements result from a square image having a side length equal to 8 ($=2^3$) pixels. In the first set 10 of picture elements, corresponding to the k=0 or zero-th level, each image element is a square having a side length equal to $2^0$, or 1, pixel. Thus, the first set 10 of image elements, i.e., the 0 level, has the same resolution as the original input image.

In the second set 11 of picture elements, or the k=1 or first level, each of the picture elements in the second set 11 is a square having a side length equal to $2^1$, or 2, pixels. In the third set 12 of image elements, or the k=2 or second level, each image element is a square having a side length equal to $2^2$, or 4, pixels. The fourth set 13 of image elements, or the k=3 or third level, has a single image element having a side length equal to $2^3$, or 8, pixels.

Accordingly, as shown in FIG. 1, as the sets of image elements go from the zero-th level to the third level, the resolution is halved in each direction. Thus, each image element in the first-third levels overlaps four image elements of the previous zero-th - second level, respectively. In particular, the number of potential levels in an image, as described in greater detail below, will be equal to ceiling ($Log_2(N)$), where N is the length of the longest side of the image and ceiling is a rounding-up operation. That is, the total number of sets of image elements, i.e., the number of levels of the pyramid, is derived from the size of the image. Additionally, as illustrated in FIG. 1, the maximum level of the pyramid to use to fill any given region of confusion is 1+K, where K=floor ($Log_2(L)$), where L is the edge length of the region of confusion and floor is a rounding-down operation (which is equivalent to K, when K=ceiling ($Log_2(L)$)).

Once the particular sets of image elements, or levels, for any given pixel is determined based on that pixel's region of confusion, the contribution of the image data of that pixel to the various pixels in the region of confusion can be determined using the sets of image elements.

Figure 2C:
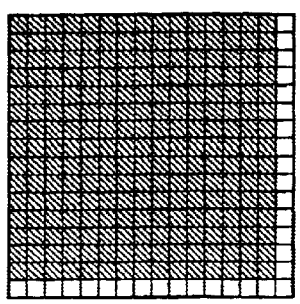
FIG. 2C shows the region of confusion for the image data and image depth data of FIGS. 2A and 2B.
Figure 2H:
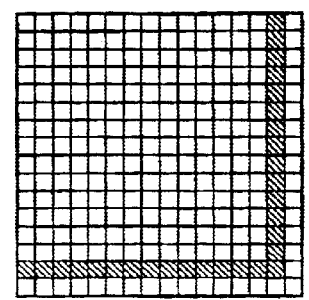
FIGS. 2D–2H show an exemplary pyramid representation of the original image and a representation of the contributions from the region of confusion of the single pixel shown in FIGS. 2A and 2B to the final image.
Figure 2G:
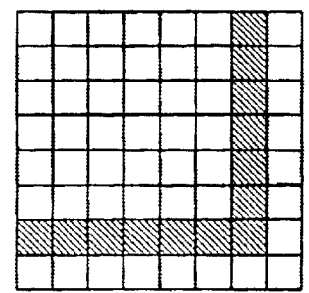
Figure 2F:
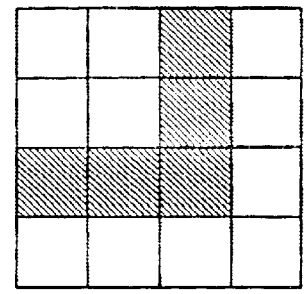
Figure 2B:
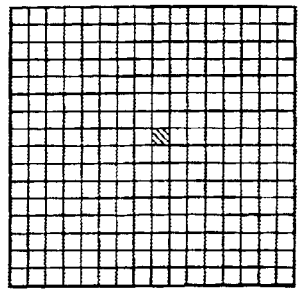
FIG. 2B represents the original image depth data for the image shown in FIG. 2A.
Figure 2E:
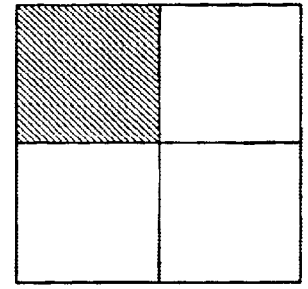
Figure 2A:
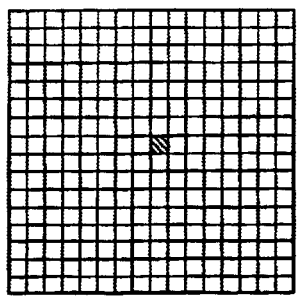
FIG. 2A shows an original 16×16 image having a single pixel set to a value other than zero.

FIGS. 2A–2H detail the contribution of an exemplary current pixel in a 16 pixel×16 pixel input image to the region of confusion for that pixel. FIG. 2A shows the input image and highlights the current pixel that contributes to the sets of image elements shown in FIGS. 2D–2H to arrive at the output region of confusion shown in FIG. 2C. FIG. 2B represents the depth of focus data for the current pixel and will be discussed in more detail below. FIG. 2C shows that the region of confusion for the current pixel is not necessarily the same size as the original image. Rather, for the image depth data of the current pixel represented in FIG. 2B, the region of confusion for the current pixel is the region shown in gray (i.e., the current pixel contributes only to the output pixels shown in gray).

FIGS. 2D–2H show that the defocused image generating systems and methods of this invention determine, based on the size of the original image, that there are five levels of resolutions for the input image. Therefore, there are five sets of image elements to which each of the input pixels may contribute. The particular sets of image elements a given pixel will contribute to, and the particular image elements in each such set, is based on the depth of focus data for that pixel and its location in the input image. In particular, for a given pixel, the depth of focus data defines the extent of the region of confusion for that pixel. Then, the relationship between each image element of each set and the region of confusion determines if that pixel contributes to that image element.

Figure 2D:
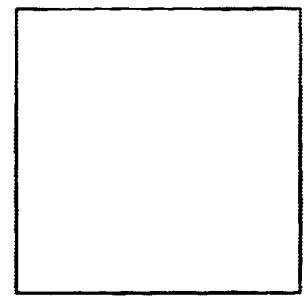
Figure 3D:
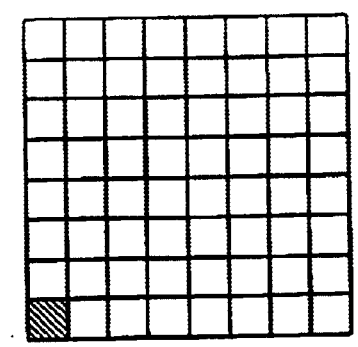
FIGS. 3A–3E show the contribution of each of a number of pyramid buffers to the final reconstructed image.
Figure 3C:
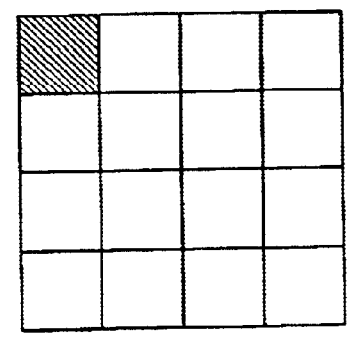
Figure 3B:
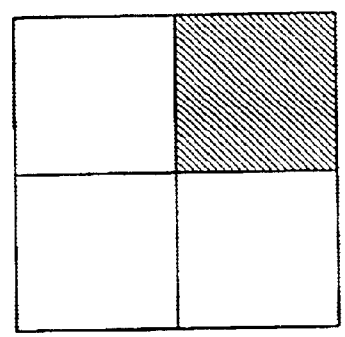
Figure 3A:
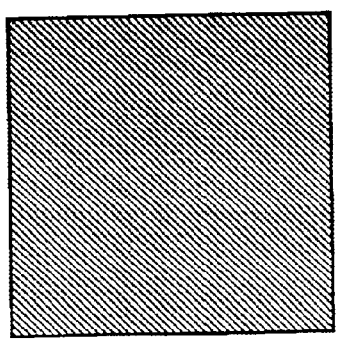
Figure 3E:
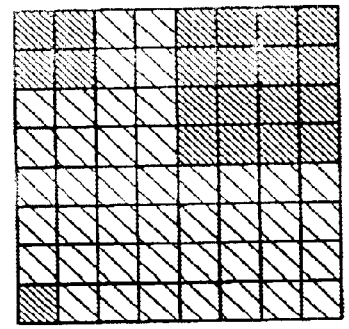

The basic determination, for each image element in each set of image elements, is whether that image element falls entirely within the region of confusion for the current pixel, and, at the same time, does not fall entirely within the bounds of an image element of a lower resolution set of image elements that itself falls entirely within the region of confusion for the current pixel. The image element in the lowest resolution set of image elements, as shown in FIG. 2D, is larger than the region of confusion shown in FIG. 2C. Therefore, the current pixel does not fall entirely within the region of confusion for this pixel, and thus does not contribute to the image element in the lowest resolution set of image elements shown in FIG. 2D.

Next, the defocused image generating systems and methods of this invention determine the contribution of the current pixel to the next higher resolution set of image elements. In this example, the defocused image generating systems and methods of this invention determine that only the upper right image element in the second set of image elements shown in FIG. 2E fits entirely within the region of confusion shown in FIG. 2C. Therefore, the current pixel contributes only to this image element of this set of image elements.

Next, the defocused image generating systems and methods of this invention determine the contributions of the current pixel to the elements in the next higher resolution set of image elements. As shown in FIG. 2F, the current pixel contributes only to the five image elements in this current set of image elements shown in gray. The contributions by the current pixel to other ones of the image elements of this set of image elements are either already represented by lower resolution image elements that entirely contain other image elements of the set of image elements shown in FIG. 2F, or the other image elements of this set of image elements shown in FIG. 2F extend at least partially beyond the region of confusion.

In this example, the four elements in the upper right portion of the set of image elements shown in FIG. 2F fall entirely within the bounds of the upper right element of the set of image elements shown in FIG. 2E. Therefore, the current pixel does not contribute to these elements. The current pixel also does not contribute to the left-most and bottom-most elements of the set of image elements shown in FIG. 2F because those elements extend beyond the region of confusion shown in FIG. 2C.

The defocused image generating systems and methods of this invention continue to determine the contributions of the current pixel to the elements in the sets of image elements in the remaining sets until the entire region of confusion shown in FIG. 2C has been represented by a contribution of the current pixel to one of the image elements of the various sets of image elements.

This process is then repeated by selecting, in turn, each pixel of the original image as the current pixel. Then, sets of image elements are added together to arrive at the defocused output image. In other words, the regions of confusion from all pixels in the input image are combined or composited together to form the defocused output image.

FIGS. 3A through 3E demonstrate how the final output image is recombined or composited. FIGS. 3A–3D each show a different resolution level of the multiresolution pyramid after processing all pixels in an input image. To arrive at the output image shown in FIG. 3E, all of the set of image elements making up the multiresolution pyramid are added together.

The defocused image generating systems and methods of this invention start with a 2-D matrix of rendered image pixels I(i,j), where each pixel has an image intensity value, and an associated image depth, or z-depth. The image intensity value can be a binary value, for a black/white image, a byte value, for 8-bit greyscale images, or a multi-byte value for color images. For example, a color image will generally have one byte for each of a set of color components. Typically, these color components will be a red (R) intensity value, a green (G) intensity value and a blue (B) intensity value.

The defocused image generating systems and methods of this invention simplify the determination of the contribution of each input image pixel to the defocused output image by, for each pixel (i,j) in the input image, determining the radius of the circle of confusion as:

$$r=f(Z(i,j)), \qquad (5)$$

where:
Z represents the image depth, or z buffer, data;
f represents the function of the circle of confusion radius with respect to the image depth, or z buffer, data using Eq. 1;
i refers to the x offset in the image data, or z, buffer; and
j refers to the y offset in the image data, or z, buffer.

Then, the defocused image generating systems and methods of this invention convert the circle of confusion into a region of confusion. Next, the defocused image generating systems and methods of this invention determine the decomposition of the region of confusion centered about pixel (i,j) into a minimum sets of image elements in the pyramid representation that exactly covers the region of confusion:

$$S(i,\ j) = \bigcup_k S_k \text{ from } k = 0 \text{ to floor } (\text{Log}_2 N) \qquad (6)$$

where $S_k$ represents the set of elements within the kth pyramid level for the region of confusion for the pixel at location i,j in the input image. The set S includes the union of the set of image elements that must be filled at each level in the pyramid representation in order to fully cover the region of confusion.

Then the defocused image generating systems and methods of this invention modify each element of the pyramid representation which corresponds to elements in set $S_k$ at each level k by adding an appropriate color value based on the intensity value of pixel (i,j).

After all the input image pixels have been processed, the sets of image elements of the pyramid representation are combined to form a final defocused output image.

In order to implement the defocused image generating systems and methods of this invention, as outlined above, it is necessary to decompose the region of confusion into the multi-resolution pyramidal representation. In one exemplary embodiment of the defocused image generating systems and methods of this invention, each circular area of confusion is approximated using a square region of confusion. In this exemplary embodiment of the defocused image generating systems and methods of this invention, the image to be defocused is assumed to be square.

Therefore, one exemplary input image is a square having sides of length N pixels. A pyramid representation can then be created for this input image as a sequence of K sub-images, where K is:

$$K = \text{ceiling}(\log_2 N) \quad (7)$$

Each sub-image will contain one or more image elements and each image element will extend over one or more pixels in each direction. In particular, each image element in the kth set of image elements will extend over $2^k$ pixels in each direction, and thus each kth-level image element will have a side length $n_k$ of $2^k$ and an area of $2^{2k}$. The kth sub-image thus has $2^{2(K-k)}$ image elements.

While FIG. 2 was described above with respect to the 15-pixel-square region of confusion shown in FIG. 2C generated from the image and depth data shown in FIGS. 2A and 2B, FIGS. 2D–2H also illustrate the potential number of levels to be generated for the square image shown in FIG. 2A having a side length N of 16. From Eq. (7), for the image shown in FIG. 2A, K is equal to 4. Thus, from Eq. (6), because K is an integer that varies from 0 to K, or 0 to 4, the potential number of levels in the multi-resolution pyramid representation is 1+K, or 5. Each of these levels is shown in FIG. 2. In particular, the fifth set 14 of picture elements, i.e., the Kth or fourth level, is shown in FIG. 2D, while the first set 10 of picture elements, i.e., the zero-th level, is shown in FIG. 2H.

It should also be appreciated that, by comparing FIGS. 1, 2A and 2E, the 8-pixel-square image element of the fourth set 13 of image elements, or third level 13, shown in FIG. 1 corresponds to one of the picture elements of the fourth set 13 of image elements, or third level 13, shown in FIG. 2E.

The first set 10 of image elements, or the k=0 or zero-th level, has 256 elements. Each of the image elements in the first set 10 of image elements is the same size as the size of the pixels in the original image. That is, each image element in the first set 10 of image elements has an extent of $2^0$, or 1 pixel, in each direction and an area of $2^{2\cdot0}$, or 1, pixel. The second set 11 of image elements, or the k=1 or first level, has 64 image elements. Each of the image elements in the second set 11 of image elements is four times the size of the pixels in the original image. That is, each image element in the second set 11 of image elements has an extent of $2^1$, or 2, pixels in each direction, and an area of $2^{2\cdot1}$, or 4, pixels.

The third set 12 of image elements, or the k=2 or second level, has 16 image elements that are each 16 times the size of the pixels in the original image. That is, each image element in the third set 12 of image elements has an extent of $2^2$ or 4 pixels, in each direction, and an area of $2^{2\cdot2}$, or 16, pixels. The fourth set 13 of image elements, or the k=3 or third level, has four image elements that are each 64 times the size of each pixel in the original image. That is, each image element in the fourth level 13 has an extent in each direction of $2^3$, or 8, pixels and an area of $2^{2\cdot3}$, or 64, pixels.

The fifth set 14 of image elements, or the k=4 or fourth level, has a single image element that is 256 times the size of each pixel in the original image. At this point, k=K=4. Thus, there are no more levels or sets of image elements for the original image having N=16.

Each square region of confusion of size M×M pixels, where 1 ≤ M ≤ N, that is centered about a particular pixel (i,j) in the original image may be decomposed into a set of image elements in the pyramid representation. Such a region of confusion has its lower left hand corner at coordinates (x, y) in the original image where:

$$x = i - \frac{M}{2}; \text{ and} \quad (8)$$

$$y = j - \frac{M}{2}; \quad (9)$$

where:

$$M = 2r, \quad (10)$$

where r is the radius of the circle of confusion determined above according to Eq. (1) based on the image depth data for the particular pixel (i,j).

The original or input image pixel value is distributed over the determined region of confusion. In particular, any given pixel (i,j) has an input image intensity I(i,j). As indicated above, depending on the type of image, the input image intensity may be 1 bit, for a binary image, a byte for a greyscale image, or multiple bytes, for a full-color image. In the exemplary embodiments of the defocused image generating systems and methods of this invention, the input image intensity is equally distributed over the region of confusion. That is, a single flat fill color c is used for every pixel of the region of confusion generated from the given pixel (i,j). The single flat fill color c is determined from the input intensity I as:

$$c = \frac{I(i,j)}{M \times M} \quad (11)$$

where:

c(i,j) is the flat fill color of each pixel in the region of confusion for the input pixel (i,j); and I(i,j) is the input image value for the pixel (i,j).

For a pixel having a region of confusion of size M and that region of confusion having an origin of (x,y), the number $B_K$ of elements of size $n_k$, where $n_k$ is the side length of the kth level elements, for the K-th level that will be used by the defocused image generating systems and methods of this invention is:

$$B_K = \{\text{floor}[{}^{(x+M)}/{n_k}] - \text{ceiling } ({}^x/{n_k})\} * \{\text{floor}[{}^{(Y+M)}/{n_k}] - \text{ceiling}({}^y/{n_k})\}. \quad (12)$$

For the pixel having the region of confusion of size M and that region of confusion having the origin of (x,y), the number of elements of size $n_k$ for the zero-th to(K−1)th levels that will be used by the defocused image generating systems and methods of this invention may be determined iteratively from k=K−1 to 0 as:

$$B_k = \left\{ floor\left[\frac{(x+M)}{n_k}\right] - ceiling\left(\frac{x}{n_k}\right) \right\} * \quad (13)$$

-continued $$\left\{floor\left[\frac{(y+M)}{n_k}\right] - ceiling\left(\frac{y}{n_k}\right)\right\} - \sum_{c=1}^{k}\left(\frac{n_{k-c}}{n_k}\right)^2 B_{k-c}.$$

where:
"floor" is a rounding-down operation; and
"ceiling" is a rounding-up operation.

Starting with elements of size $n_k$, in a first exemplary algorithm according to the systems and methods of this invention, a counter is set equal to =0 and the kth level is set equal to K, i.e., k=K.

For the kth level, the number of elements of size $n_k$, which fit within a remaining area of the region of confusion to be filled using the flat fill color c, is determined using Eq. (12) for k =K, or Eq. (13) for k≠K.

If $B_k$ is not equal to zero, as many elements in the kth level of the pyramid are filled in as possible, using the flat fill color c. The counter is incremented each time an image element is filled in the kth level. In particular, if the counter is equal to zero, as many image elements in the kth level are filled in as possible. The counter is then incremented as each image element is filled using the flat fill color c. However, if the counter is not equal to zero, then a portion of the region of confusion has already been filled using the flat fill color c. Therefore, filling the same area multiple times at increasingly finer resolutions must be avoided. Thus, as much of the area is filled in as possible between the boundary of the region of confusion and the portions of the region that have already been filled. Since coarser resolutions are multiples of fine resolutions, overlap can be avoided simply by keeping track of the boundaries of the filled portions of the region of confusion.

Then, k is decremented and the number of element and element filling steps are repeated until the region of confusion has been completely filled.

Figure 4:
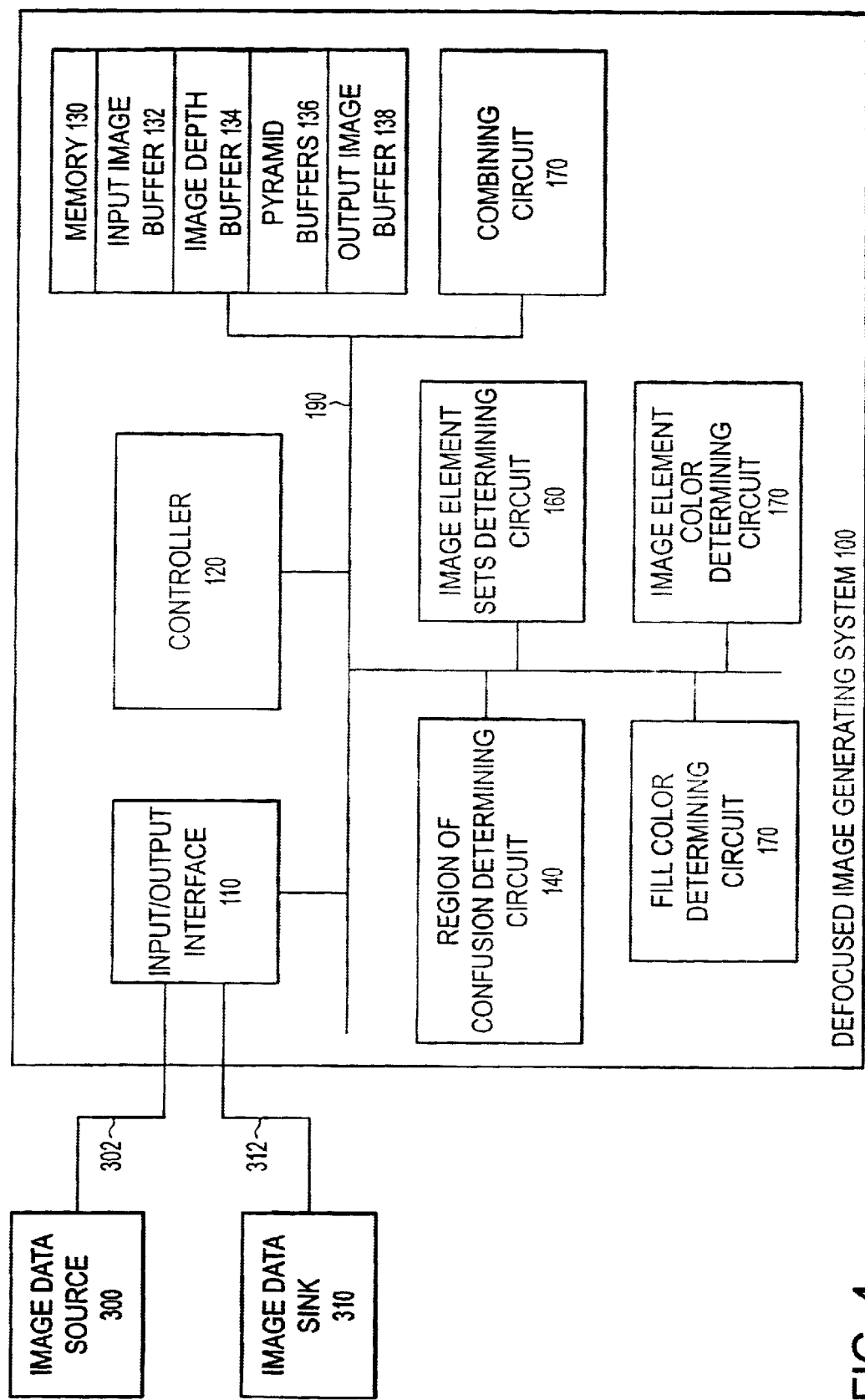
FIG. 4 is a functional block diagram of a first exemplary embodiment of the defocused image generating system of this invention.

FIG. 4 is a block diagram outlining one exemplary embodiment of a defocused image generating subsystem 100 according to this invention. As shown in FIG. 4, the defocused image generating subsystem 100 is connected to an image data source 300 over a signal line 302 and an image data sink 310 over a signal line 312. The image data source 300 can be any known or later developed source of electronic image data such as a host computer, a scanner, a node of a distributed network or the like. The signal line 302 can be any known or later developed method for connecting the image data source 300 to the defocused image generating system 100, including a direct wired connection, such as to a scanner or a camera of a vision system. The signal line 302 an also be a connection over a distributed network, such as a LAN, a WAN, an intranet, the Internet, or any other known or later developed distributed network.

The image data provided by the image data source 300 will generally be in bitmap or bytemap form, and must include depth data for each pixel that indicates the distance of that pixel from the image plane to a lens element. However, it should be appreciated that the image data does not need to be received by the defocused image generating subsystem 100 in this form, if this form for the image data can be generated by the defocused image generating system 100 from the received form of the image data. Thus, the image data can be received as a virtual reality markup language (VRML) file, an MPEG-1, MPEG-2, MPEG-4, or MPEG-J file, or any other known or later developed image data format that defines sufficient information that the location of the pixel in the image plane and the distance of that pixel from a lens element can be determined.

It should also be appreciated that the image data source 300 can be the vision inspection system simulation system described in U.S. patent application Ser. No. 09/243,689, incorporated herein by reference in its entirety. In the incorporated 689 application, the vision inspection system simulation system is preferably implemented on a programmed general purpose computer and includes a user interface subsystem, a data processing subsystem and a hardware interface. The hardware interface includes a light control subsystem, a framegrabber subsystem, a lens control subsystem and a motion control subsystem. The data processing subsystem includes a vision inspection system simulation processing subsystem that communicates with a configuration subsystem and an external view. The configuration subsystem stores models of a virtual world and includes a systems lighting model, a motion control model, a workpiece model, and lens and camera configuration data that are used by the data processing subsystem to produce still and/or real-time synthetic images. The vision inspection system simulation system is capable of producing images of a simulated vision inspection target at differing heights relative to a virtual optical system and camera.

The image data sink 310 can likewise be any known or later developed device that is able to receive the defocused image generated by the defocused image generating system 100, such as a printer, a display device, a host computer, or a node of a distributed network. The signal line 312 connecting the image data sink 310 to the defocused image generating systems 100 can be an internal bus of a host computer, a wired connection such as to a printer, or a connection over the distributed network. Thus, the signal line 312, like the signal line 302, can be any known or later developed structure for connecting the image sink 310 to the defocused image generating system 100.

As shown in FIG. 4, the defocused image generating subsystem 100 includes an input output interface 110, a controller 120, a memory 130, a region of confusion determining circuit 140, a fill color determining circuit 150, an image element sets determining circuit 160, an image element color determining circuit 170 and a combining circuit 180, all interconnected by a data and/or control bus 190. In particular, the memory 130 includes an input image buffer 132, an image depth buffer 134, a plurality of pyramid buffers 136, and an output image buffer 138.

When image data is received by the image source 300, it is input to the defocused image generating subsystem 100 over the input output interface 110 and, under control of the controller 120, stored in the memory 130. If the image data received from the image source 300 over the signal line 302 is already in a form of input image data and image depth data, the input image data is stored in the input image buffer 132, while the input image depth data is stored in the image depth buffer 134. If the image data received from the image data source 300 over the signal line 302 is not already in image data and image depth data form, the image data as received can be stored in the memory 130 and converted by the controller 120 into image data and image depth data for storage in the input image buffer 132 and the image depth buffer 134, respectively.

Once the image data and the image depth data are stored in the input image buffer 132 and the image depth buffer 134, respectively, the depth data for each pixel is in turn provided, under control of the controller 120, to the region of confusion determining circuit 140, while the corresponding image data is provided, under control of the controller 120, to the fill color determining circuit 150. The region of confusion determining circuit 140 determines the edge length M of the region of confusion for the current pixel based on the image depth data for that pixel. Then, the fill color determining circuit 150, based on the edge length M for the region of confusion for the current pixel determined by the region of confusion determining circuit 140 and the input image value for the current pixel, determines the flat intensity distribution fill color for the region of confusion for the current pixel as described above with respect to Eq. (11).

At the same time, the image element sets determining circuit 160 determines the number of sets of image elements, i.e., the number of levels, necessary to represent the region of confusion determined by the region of confusion determining circuit 140 for the current pixel. In particular, the image element sets determining circuit 160 determines the number of sets or levels based on the edge length M. The image element color determining circuit 170 then distributes the flat intensity distribution fill color for the current pixel determined by the fill color determining circuit 150 into various ones of the image elements of the sets of image elements determined by the image element sets determining circuit 160, as outlined above with respect to FIG. 2.

The combining circuit 180 then combines the various image element sets determined by the image element set determining circuit 160 and filled by the image element color determining circuit 170. In particular, there are two potential ways in which the combining circuit 180 can combine these image element sets.

In a first method, which maintains separate each of the image element sets for the original input image, each image element set or level for the current pixel is combined with the image elements of corresponding level resulting from other pixels of the entire input image. That is, the pyramid buffers 136 includes one buffer for each potential level of the input image. As the various image elements of the various image element sets or levels for a current pixel are filled, the image data for the image elements of each particular level are combined with the image data already in the particular pyramid buffer for the corresponding image element set or level.

In this case, once all of the input pixels have been analyzed and decomposed into the various pyramid levels, the combining circuit 180 inputs the pyramid buffers 136 and combines them into a single defocused output image that is stored in the output image buffer 138.

In contrast, in the second method, the combining circuit 180 combines all of the image element sets determined by the image element set determining circuit 160 and filled by the image element color determining circuit 170 into a single defocused output image for the current pixel. This defocused output image for the current pixel is then stored in the pyramid buffers 136. After each of the defocused output images for all of the pixels of the input image are generated and stored in the pyramid buffers 136, the combining circuit 180 combines the defocused output images for all of the pixels into a single defocused output image. This defocused output image is then stored in the output image buffer 138.

Figure 5:
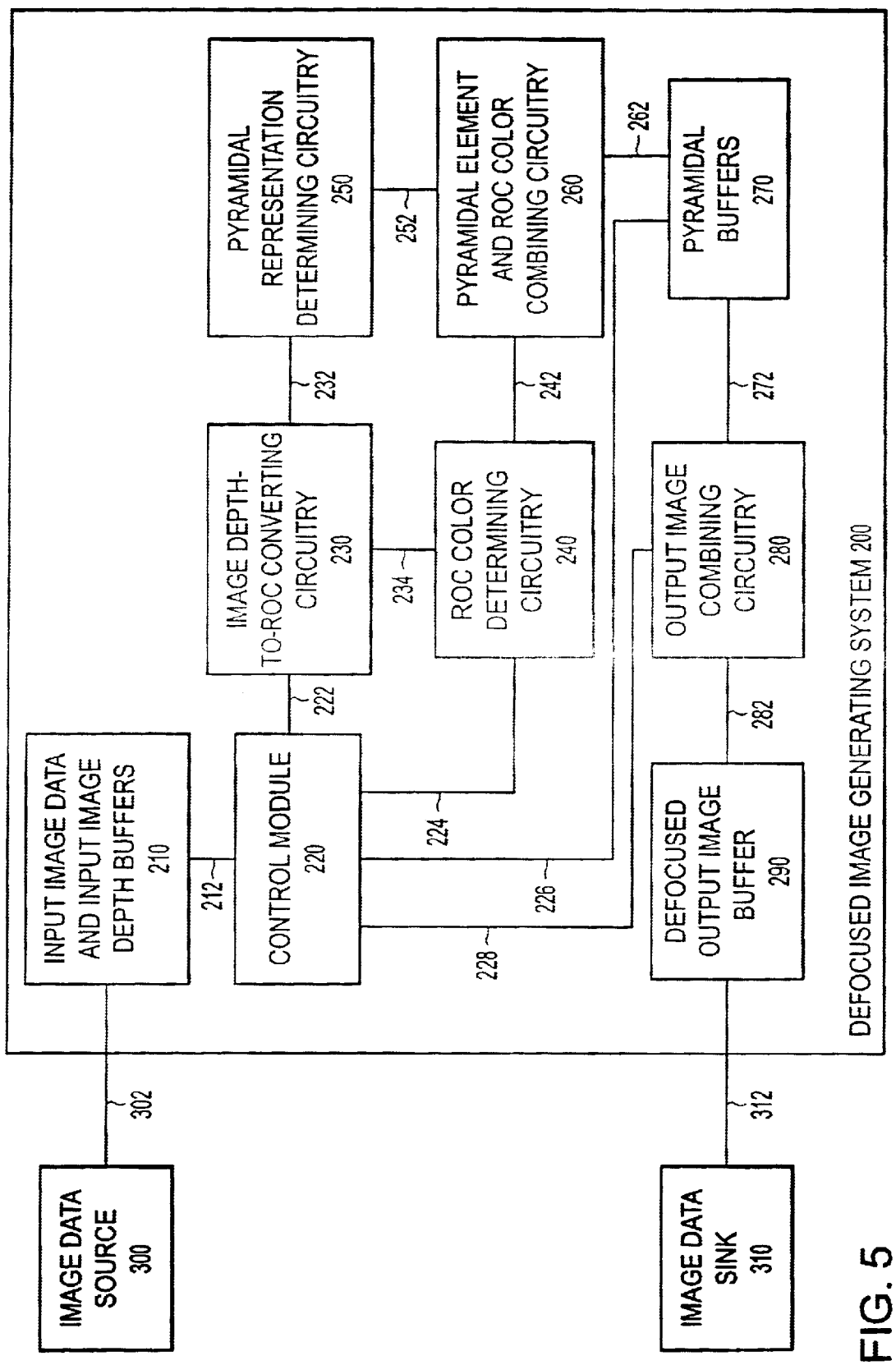
FIG. 5 is a functional block diagram of a second exemplary embodiment of the defocused image generating system of this invention.

FIG. 5 is a block diagram of a second exemplary embodiment of a defocused image generating system 200. As in the first exemplary embodiment of the defocused image generating subsystem 100 shown in FIG. 4, the defocused image generating subsystem 200 is connected to the image data source 300 over the signal line 302 and the image data sink 310 over the signal line 312. As shown in FIG. 5, the image data source 300 provides image data in the form of a bitmap or bytemap image data and a corresponding bitmap or bytemap for the image depth data. The input image data and input image depth data received from the image data source 300 over the signal line 302 is stored in the input image data and input image depth buffers 210. Once the input image data and the image depth data are available in the input image data and input image depth buffers 210, the control module 220 first clears the pyramidal buffers 270 using the signal line 226.

The control module 220 then inputs each pixel of the input image data in turn from the input image data buffer 210 and inputs the corresponding image depth data from the image depth buffer 210 over the signal line 212, transferring the image depth data to the image depth-to-region of confusion converting circuitry 230 over the signal line 220 and the image data-to-the region of confusion color determining circuitry 240 over the signal line 224.

The image depth to region of confusion converting circuitry 230 determines the side length of the square region of confusion generated from the image depth data for the current pixel. The image depth to region of confusion converting circuitry 230 outputs the region of confusion side length to the region of confusion color determining circuitry 240 over the signal line 234 and to the pyramidal representation determining circuitry 250 over the circuit line 232.

The region of confusion color determining circuitry 240 determines the flat intensity distribution fill color of the region of confusion for the current pixel based on the image data received from the control module 220 over the signal line 224 and the region of confusion side length received from the image depth-to-region of confusion converting circuitry 230 over the signal line 234. The region of confusion color determining circuitry 240 outputs the flat intensity distribution fill color for the current pixel over the signal line 242 to the pyramidal element and region of confusion color combining circuitry 260.

While the region of confusion color determining circuitry 240 determines the flat intensity distribution fill color, the pyramidal representation determining circuit 250 generates the zero-K pyramid levels of the pyramid representation for the current pixel based on the region of confusion side length obtained from the image depth-to-region of confusion converting circuitry 230 over the signal line 232. The pyramidal representation determining circuitry 250 then outputs the zero to K pyramid levels for the current pixel to the pyramidal element and region of confusion color combining circuitry 260 over the signal line 252.

The pyramidal element and region of confusion color combining circuitry 260 distributes the flat intensity distribution fill color received from the region of confusion color determining circuitry 240 over the signal line 242 into the zero-K pyramid levels received from the pyramidal representation determining circuitry 250 over the signal line 252 as outlined above with respect to FIGS. 2C–2H. The pyramidal element and region of confusion color combining circuitry 260 outputs the pyramid levels received from the pyramidal representation determining circuitry 250 over the signal line 252 and containing the distributed flat intensity distribution fill color received from the region of color determining circuitry 240 to the pyramidal buffers 270 over the signal line 262.

The pyramidal buffers 270 stores the colored pyramidal elements from the pyramidal element and region of confusion color combining circuitry 260. As outlined above with respect to FIG. 4, the pyramidal buffers 270 can be a series of pixel-oriented buffers or a number of pyramid-level-oriented buffers. If pixel-oriented buffers are used, each buffer in the pyramidal buffer 270 is associated with one of the pixels of the input image. In this case, the pyramid levels output from the pyramidal element and region of confusion color combining circuitry 260 are combined into a single zero-level representation of the region of confusion for a corresponding pixel. In contrast, if the pyramidal buffers 270 contains pyramid-level-oriented buffers, each buffer of the pyramidal buffers 270 corresponds to one of the zero-K pyramid levels that are possible based on the size of the input image represented by the input image data. In this case, each of the colored image elements output by the pyramidal element and region of confusion color combining circuitry 260 is combined with and stored into a buffer corresponding to that image element's pyramid level.

The control module 220 continues to select input image data and input image depth data from the input image data and input image depth buffers 210 over the signal line 212 until all of the pixels of the input image have been selected and their data transmitted to the image depth-to-region of confusion converting circuitry 230 and the region of confusion color determining circuitry 240. Once all of the pixels of the input image have been selected and analyzed, the control module 220 outputs a control signal over the signal line 228 to the output image combining circuitry 280.

Once the output image combining circuitry 280 receives a control signal from the control module 220 over the signal line 228, the output image combining circuitry 280 inputs all of the data stored in the pyramidal buffers 270 over the signal line 272 and combines the data in the buffers into a single defocused output image. In particular, if the pyramidal buffers 270 store the defocused image data in a pyramid-level orientation, the output image combining circuitry 280 combines each of the levels of the pyramidal representation as outlined above with respect to FIGS. 3A–3E. In contrast, if the pyramidal buffers 270 stores the defocused image data in a pixel orientation, the output image combining circuitry 280 combines the image data for each pixel into the output image data. The output image combining circuitry 280 then outputs the defocused output image to the defocused output image buffer 290 over the signal line 282. The defocused output image buffer 290 then outputs the defocused output image over the signal line 312 to the image data sink 310.

As outlined above with respect to Eqs. (8) and (9), the origin of the region of confusion for any given pixel can be determined using Eqs. (8) and (9). Additionally, as outlined above with respect to Eqs. (12) and (13), for the region of confusion for any given pixel, the number of image elements in each sub-image can be determined using Eqs. (12) and (13). Equations 14–21 set forth below outline in greater detail for the region of confusion for any given pixel, how the particular image elements to be filled in as part of the region of confusion for any particular sub-image are determined. As indicated above, for the kth level or sub-image, the image elements of the kth level have a side length $n_k$ of $2^k$.

Equations 14 and 15 define the X and Y co-ordinates, respectively, of the lower left corner of the lowermost and leftmost image element of the kth level or sub-image that is completely within the region of confusion for the current pixel. Similarly, Equations 16 and 17 define the X and Y co-ordinates, respectively, of the lower right corner of the lowermost and rightmost image element of the kth level or sub-image that is completely within the region of confusion for the current pixel. Equations 18 and 19 define the X and Y co-ordinates, respectively, of the upper left corner of the uppermost and leftmost image element of the kth level or sub-image that is completely within the region of confusion for the current pixel. Equations 20 and 21 define the X and Y co-ordinates, respectively, of the upper right corner of the uppermost and rightmost image element of the kth level or sub-image that is completely within the region of confusion for the current pixel:

$$llX_k = \text{ceiling}\left(\frac{x}{n_k}\right); \quad (14)$$

$$llY_k = \text{ceiling}\left(\frac{y}{n_k}\right); \quad (15)$$

$$lrX_k = \text{floor}\left(\frac{x+M}{n_k}\right); \quad (16)$$

$$lrY_k = \text{ceiling}\left(\frac{y}{n_k}\right); \quad (17)$$

$$ulX_k = \text{ceiling}\left(\frac{x}{n_k}\right); \quad (18)$$

$$ulY_k = \text{floor}\left(\frac{(y+M)}{n_k}\right); \quad (19)$$

$$urX_k = \text{floor}\left(\frac{(x+M)}{n_k}\right); \text{ and} \quad (20)$$

$$urY_k = \text{floor}\left(\frac{(y+M)}{n_k}\right). \quad (21)$$

where:

$llX_k$ is the x value of the lower left corner of the lowermost and leftmost kth level image element that is fully within the region of confusion;

$llY_k$ is the y value of the lower left corner of the lowermost and leftmost kth level image element that is fully within the region of confusion;

$lrX_k$ is the x value of the lower right corner of the lowermost and rightmost kth level image element that is fully within the region of confusion;

$lrY_k$ is the y value of the lower right corner of the lowermost and rightmost kth level image element that is fully within the region of confusion;

$ulX_k$ is the x value of the upper left corner of the uppermost and leftmost kth level image element that is fully within the region of confusion;

$ulY_k$ is the y value of the upper left corner of the uppermost and leftmost kth level image element that is fully within the region of confusion;

$urX_k$ is the x value of the upper right corner of the uppermost and rightmost kth level image element that is fully within the region of confusion; and $urY_k$ is the y value of the upper right corner of the uppermost and rightmost kth level image element that is fully within the region of confusion.

Once the uppermost leftmost and rightmost image elements and lowermost leftmost and rightmost image elements of the kth level or sub-image that fall entirely within the region of confusion for the current pixel are determined, the image elements for the kth level or sub-image to be filled in can then be determined. In particular, if no other image elements of coarser sub-images have been filled in, then all image elements of the kth level or sub-image that are within the bounds of the quadrilateral defined by the X and Y co-ordinates defined in Eqs. (14)–(21) are filled in using Eq. (11). In particular, "filled" refers to adding the image value defined by Eq. (11) to the current image value for each of the image elements within the bounds of the quadrilateral defined by the X and Y co-ordinates defined in Eqs. (14)–(21). If any image elements of coarser sub-images have already been filled in, then only those image elements of the current sub-image, which are within the bounds of the quadrilateral defined by the X and Y co-ordinates defined in Eqs. (14)–(21), and:

whose rightmost X coordinates are equal to or to the left of the leftmost X co-ordinate of a filled image element of a coarser sub-image, or whose leftmost X coordinates are equal to or to the right of the rightmost X co-ordinate of a filled image element of a coarser sub-image; or whose lowermost Y coordinates are equal to or above the uppermost Y co-ordinate of a filled image element of a coarser sub-image, or whose uppermost Y coordinates are equal to or below the lowermost Y co-ordinate of a filled image element of a coarser sub-image;

will be filled in according to Eq. (11). Thus, the region of confusion for the current pixel is filled in from the center of the region of confision, starting with the coarsest image elements that are fully within the region of confusion. Assuming the region of confusion does not extend to the edges of the image, as each finer sub-image is analyzed, the image elements of that sub-level will form a square annular ring around the image elements of the next coarser sub-level. If the region of confusion does extend to one or more edges of the image, as shown in FIGS. 2C–2H, as each finer sub-image is analyzed, the image elements of that sub-level will form "C"-shaped, "L"-shaped or straight line sets of image elements.

FIG. 6 is a pseudo-code listing outlining an algorithm using Eqs. (14)–(21). In the pseudo-code shown in FIG. 6, the Fill Pyramid Element (i,j,k) operation is:

$$I_k\left(\frac{i}{n_k}, \frac{j}{n_k}\right) = I_k\left(\frac{i}{n_k}, \frac{j}{n_k}\right) + \text{color to add to ROC} \quad (22)$$

where $I_k$ is the image stored at the kth pyramid level.

A final output image is reconstructed after all of the pixels in the input image and their corresponding regions of confusion have been decomposed and rendered into the multi resolution pyramid representation. As described above, FIGS. 3A–3E illustrate the reconstruction process. The reconstruction process may be expressed as:

For all $(i,j)$ in the $N \times N = 2^K \times 2^K$ output image (I):

$$I(i, j) = \sum_{K=0}^{K} I_{K-k}\left(\frac{i}{2^{K-k}}, \frac{j}{2^{K-k}}\right) \quad (23)$$

where $I_k$ is the image stored at the kth pyramid level.

Since the size of the image is typically known a priori, it is possible to use lookup tables to eliminate the division operations in Eq. (23).

Potmesil describes a sophisticated distribution model that takes diffraction effects into account. The exemplary embodiments of the defocused image generating systems and methods of this invention use a flat illumination model to increase system throughput. However, if sufficient computational resources are available, the flat illumination model described above can be replaced with a more sophisticated model that allows for additional lens effects, such as diffraction effects, to be included.

Similarly, the exemplary embodiments of the defocused image generating systems and methods of this invention model the circle of confusion as a square region of confusion to simplify the decomposition of the circle of confusion into the image element sets of the pyramid representation. A further exemplary embodiment of the defocused image generating systems and methods of this invention determines that if a circle of confusion's radius exceeds a certain threshold, then that pixel's contribution is not rendered to the final, defocused image. Consequently, rendering quality and rendering speed can be balanced in a simple and easy to understand way by adjusting the threshold. Of course, this can result in significant details being dropped from a final image.

Figure 7A:
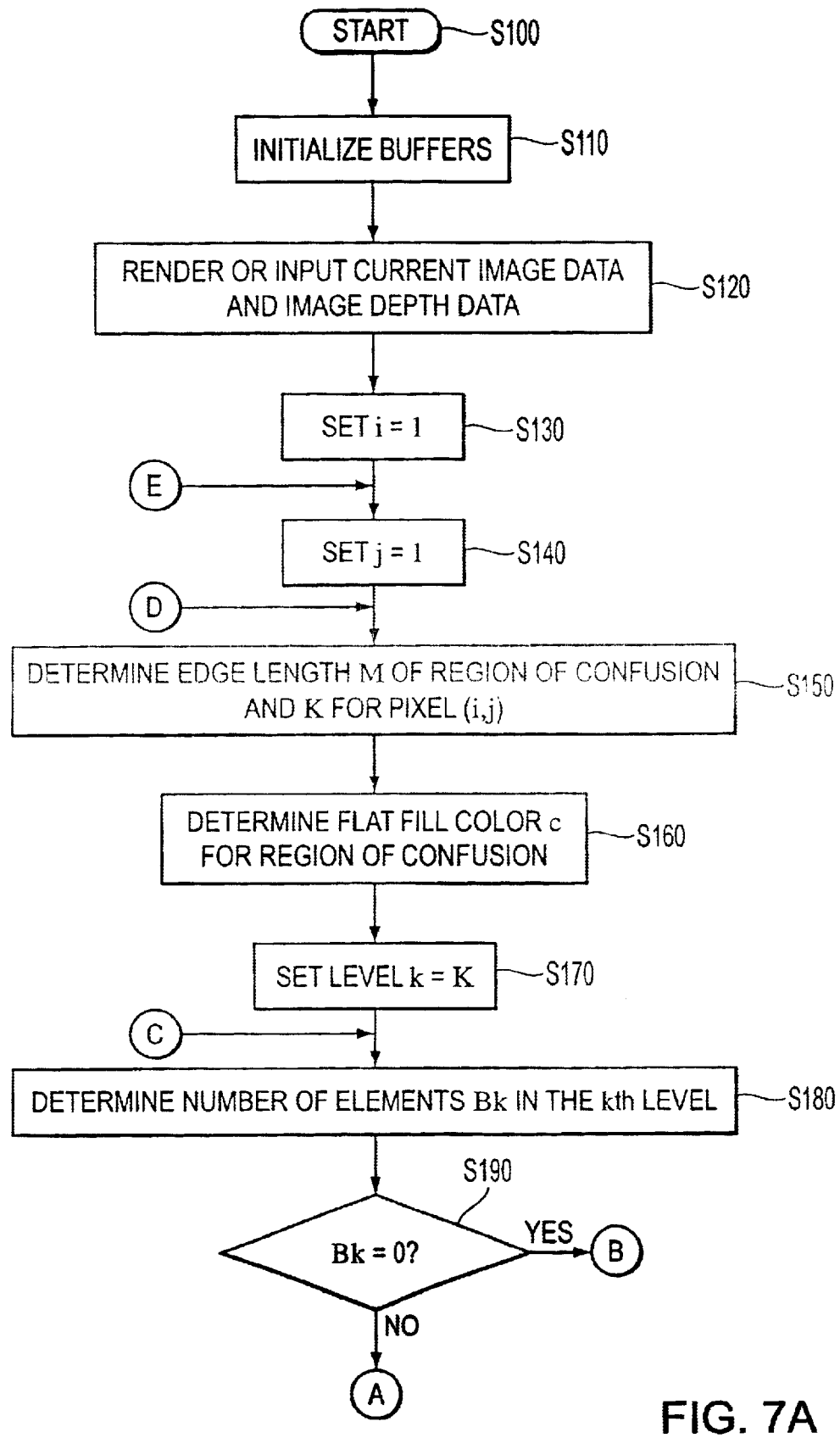
FIGS. 7A and 7B are a flowchart outlining one exemplary embodiment of a method for generating a defocused image according to this invention.
Figure 7B:
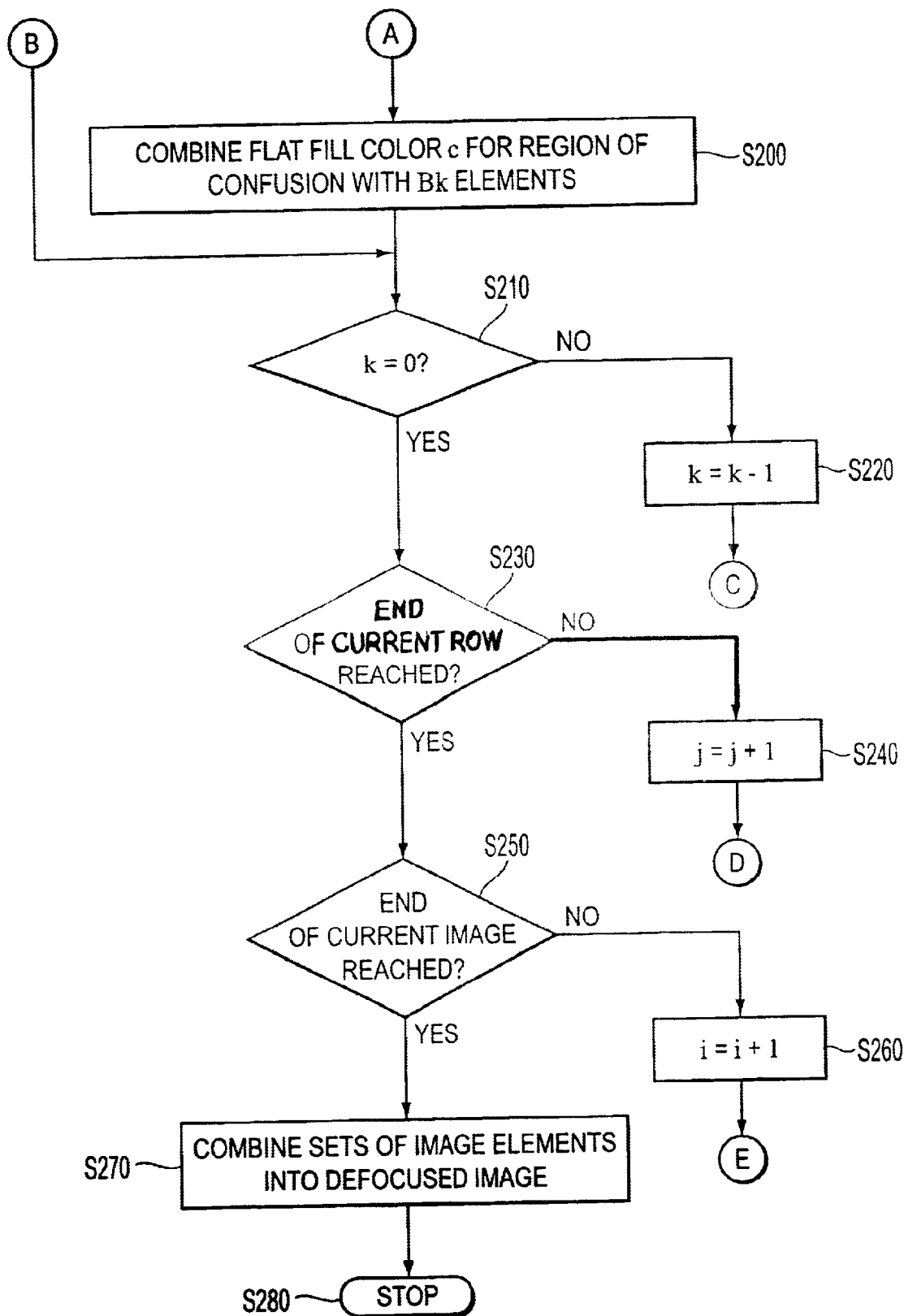

FIGS. 7A and 7B are a flowchart outlining one exemplary embodiment of a method for generating a defocused image in accordance with this invention. As shown in FIG. 7A, control starts at step S100, and continues to step S110, where the buffers are initialized, or cleared. These buffers include an input image data buffer, an output image data buffer, an image depth data buffer, and the buffers for each set of image elements of the multi-resolution pyramid representation of the input image. Next, in step S120, the current image data and image depth data are rendered or are input from an image data source. Then, in step S130, a row counter i is reset, and in step S140, a column counter j is reset. Control then continues to step S150.

In step S150, the input image intensity I for the current pixel (i.e., the pixel at location (i,j)) and the image depth data for the current pixel are used to determine the edge length M of the region of confusion for the pixel (i,j). Also determined in step S150 is the number of sets K of image elements that the region of confusion for the current pixel (i,j) contributes to. Then, in step S160, the flat fill color c for the region of confusion for the current pixel (i,j) is determined from the determined edge length and the image intensity for the current pixel (i,j). Next, in step S170, the current level counter k is set equal to the number of levels K to which the current pixel (i,j) will contribute. Control then continues to step S180.

In step S180, the number of image elements $B_k$ in the kth level is determined based on Eqs. (12) and (13), as outlined above. Then, in step S190, a determination is made whether the number of elements $B_k$ is equal to zero. If not, control continues to step S200. Otherwise, control jumps direction to step S210.

In step S200, the flat fill color c for the region of confusion determined in step S160 is used to fill each of the $B_k$ image elements determined in step S180. Control then continues to step S210.

In step S210, a determination is made whether the current level k is equal to 0. If the current level k is equal to 0, all of the levels for the current pixel have been analyzed and the particular image elements $B_k$ in each level have been colored using the flat fill color c. In this case, the next pixel needs to be selected. Control thus continues to step S230. However, if not all of the levels for the current pixel have been analyzed, control continues to step S220.

In step S220, the current level k is decremented by 1 to select the next higher resolution level. Control then jumps back to step S180.

In contrast, in step S230, a determination is made whether the end of the current row of the input image has been reached. If not, control continues to step S240. Otherwise, control jumps to step S250.

In step S240, the column counter j is incremented by 1 to select the next pixel along the current row i. Control then jumps back to step S150.

In contrast, in step S230, a determination is made whether the end of the current image has been reached. If the end of the current image has not been reached, control continues to step S260. Otherwise, if the end of the current image has been reached, control jumps to step S270.

In step S260, the current row counter i is incremented to select the next row of the image. Control then jumps back to step S140, where the column counter j is reset to 1 to select the first pixel of the next row of the input image. Control then continues to step S150.

In step S270, once the end of the current image has been reached, such that all of the pixels in the input image have been analyzed, the sets of image elements $B_k$ generated in steps S180–S200 for each pixel of the input image are combined together to form the defocused image. Control then continues to step S280, where the control method stops.

It should be understood that, while the above-outlined exemplary embodiments use a pyramid representation as the multi-resolution representation, any multi-resolution decomposition technique can be used by the defocused image generating systems and methods of this invention. It should also be understood that lookup tables can be used accelerate the decomposition operation of the defocused image generating systems and methods of this invention.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for generating a defocused image from an input image having pixels, the input image having a size and including depth data and image value data for each pixel, the method comprising:

determining a plurality of image element sets, each image element set having a different resolution and comprising at least one image element;

determining, for each pixel, a region of confusion for that pixel based on at least the depth data for that pixel, each region of confusion having a size;

determining, for each pixel, at least one image value contribution based on the image value data and the size of the region of confusion for that pixel;

determining, for at least one image element of at least one image element set, the contributing pixels which provide at least one image value contribution to that image element;

determining the image value data of at least one image element of at least one image element set based on the at least one image value contribution of at least one contributing pixel for that image element; and combining image value data of corresponding image elements of the plurality of element sets to generate the defocused image.

2. The method of claim 1, wherein determining, for each pixel, the region of confusion for that pixel based on at least the depth data for that pixel comprises determining the region of confusion further based on data corresponding to the characteristics of an optical system.

3. The method of claim 2, wherein the characteristics of the optical system comprise at least one of an aperture, a focal length, a magnification, and a position relative to a frame of reference corresponding to the depth data.

4. The method of claim 1, wherein the input image is derived at least partially from electronic data defining at least one object appearing in the input image.

5. The method of claim 1, wherein determining a plurality of image element sets includes determining a number of image element sets based at least partly on the size of the input image.

6. The method of claim 1, wherein determining a plurality of image element sets includes determining the resolution of at least one first image element set to be coarser than the pixel resolution.

7. The method of claim 1, wherein the image value data comprises at least one of intensity data and color data.

8. The method of claim 1, wherein each at least one image element further comprises a size and location, each region of confusion further comprises a location, and determining, for at least one image element of at least one image element set, the at least one contributing pixel that provides at least one image value contribution to that image element comprises determining the at least one contributing pixel based at least on the size of that image element, the size of the region of confusion of each pixel, and relative locations of that image element and each pixel.

9. The method of claim 1, wherein each at least one image element further comprises a size and location, the defocused image comprises a set of output pixels, and combining image value data of corresponding image elements of the plurality of element sets to generate the defocused image comprises determining the image value data for each output pixel by combining the image value data from each image element which overlaps the location of that output pixel.

10. A recording medium that stores a control program, the control program executable on a computing device, the computing device couplable to a recording device that stores an input image having a size and pixels and including depth data and image value data for each pixel, the control program including instructions for:

determining a plurality of image element sets, each image element set having a different resolution and comprising at least one image element;

determining, for each pixel, a region of confusion for that pixel based on at least the depth data for that pixel, each region of confusion having a size;

determining, for each pixel, at least one image value contribution based on the image value data and the size of the region of confusion for that pixel;

determining, for at least one image element of at least one image element set, the contributing pixels which provide at least one image value contribution to that image element;

determining the image value data of at least one image element of at least one image element set based on the at least one image value contribution of the contributing pixels for that image element; and combining image value data of corresponding image elements of the plurality of element sets to generate the defocused image.

11. A carrier wave encoded to transmit a control program to a device capable of executing the control program, the device couplable to a recording device that stores an input image having a size and pixels and including depth data and image value data for each pixel, the control program including instructions for:

determining a plurality of image element sets, each image element set having a different resolution and comprising at least one image element;

determining, for each pixel, a region of confusion for that pixel based on at least the depth data for that pixel, each region of confusion having a size;

determining, for each pixel, at least one image value contribution based on the image value data and the size of the region of confusion for that pixel;

determining, for at least one image element of at least one image element set, the contributing pixels which provide at least one image value contribution to that image element;

determining the image value data of at least one image element of at least one image element set based on the at least one image value contribution of the contributing pixels for that image element; and combining image value data of corresponding image elements of the plurality of element sets to generate the defocused image.

12. A method for simulating defocused images based on characteristics of at least one machine vision hardware component, comprising:

generating an image of a virtual world containing at least one object based upon a first model that characterizes the at least one object and a second model that characterizes an optical system usable to view the at least one object;

determining, based on the first and second models, a set of pixels that represent a portion of the at least one object that is visible through the optical system, each pixel including depth data and image value data;

determining a plurality of image element sets, each image element set having a different resolution and comprising at least one image element;

determining, for each pixel, a region of confusion for that pixel based on at least the depth data for that pixel, each region of confusion having a size;

determining, for each pixel, at least one image value contribution based on the image value data and the size of the region of confusion for that pixel;

determining, for at least one image element of at least one image element set, the contributing pixels which provide at least one image value contribution to that image element;

determining the image value data of at least one image element of at least one image element set based on the at least one image value contribution of the contributing pixels for that image element; and combining image value data of corresponding image elements of the plurality of element sets to simulate a defocused image of the portion of the at least one object that is visible through the optical system.

13. The method of claim 12, wherein determining, for each pixel, the region of confusion for that pixel based on at least the depth data for that pixel comprises determining the region of confusion further based on the second model.

14. The method of claim 13, wherein the second model comprises representations of at least one of an aperture, a focal length, a magnification, and a position of the optical system relative to the at least one object.

15. The method of claim 13, further comprising providing the simulated defocused image to a machine vision control system.

16. The method of claim 13, wherein determining a plurality of image element sets includes determining a number of image element sets based at least partly on a size of the set of pixels that represent the portion of the at least one object that is visible through the optical system.

17. The method of claim 13, wherein determining a plurality of image element sets includes determining the resolution of at least one first image element set to be coarser than the pixel resolution.

18. The method of claim 13, wherein each at least one image element further comprises a size and location, each region of confusion further comprises a location, and determining, for at least one image element of at least one image element set, the at least one contributing pixel that provides at least one image value contribution to that image element comprises determining the at least one contributing pixel based at least on the size of that image element, the size of the region of confusion of each pixel, and relative locations of that image element and each pixel.

19. The method of claim 13, wherein each at least one image element further comprises a size and location, the defocused image comprises a set of output pixels, and combining image value data of corresponding image elements of the plurality of element sets to generate the defocused image comprises determining the image value data for each output pixel by combining the image value data from each image element which overlaps the location of that output pixel.

20. An image simulation system that generates a defocused image from an image having pixels and including depth data and image value data for each pixel, the image simulation system comprising:

an image element sets determining circuit that determines a plurality of image element sets, each image element set having a different resolution and at least one image element;

a plurality of image element buffers, each image element buffer storing one of the determined plurality of image element sets;

a region of confusion determining circuit;

a fill color determining circuit;

an image element color determining circuit; and a combining circuit.

21. The image simulation system of claim 20, wherein the region of confusion determining circuit determines, for each pixel, a region of confusion for that pixel based on at least the depth data for that pixel.

22. The image simulation system of claim 21, wherein the region of confusion determining circuit determines, for each pixel, the region of confusion further based on data corresponding to the characteristics of an optical system.

23. The image simulation system of claim 22, wherein the characteristics of the optical system comprise at least one of an aperture, a focal length, a magnification, and a position relative to a frame of reference corresponding to the depth data.

24. The image simulation system of claim 21, wherein the fill color determining circuit determines, for each pixel, a fill color based on the image value data and a size of the determined region of confusion for that pixel.

25. The image simulation system of claim 20, wherein the image element sets determining circuit determines the resolution of at least one first image element set to be coarser than the pixel resolution.

26. The image simulation system of claim 20, wherein:

each at least one image element further comprises a size and location and each region of confusion further comprises a location; and the image element color determining circuit determines, for at least one image element of at least one image element set, at least one contributing pixel that provides an image value contribution to that image element.

27. The image simulation system of claim 26, wherein the image element color determining circuit determines, for each image element, the at least one contributing pixel based at least on the size of that image element, a size of the region of confusion of each pixel, and relative locations of that image element and each pixel.

28. The image simulation system of claim 20, wherein:

each at least one image element further comprises a size and location, the defocused image comprises a set of output pixels; and the combining circuit combines image value data of corresponding image elements of the plurality of element sets to generate the defocused image.

29. The image simulation system of claim 28, wherein the combining circuit determines the image value data for each output pixel of the defocused image by combining the image value data from each image element which overlaps the location of that output pixel.

30. A defocused image generating system that simulates a defocused image based on characteristics of at least one machine vision hardware component, comprising:
- a first model characterizing at least one object in a virtual world;
- a second model characterizing an optical system;
- means for generating an image based upon the first and second models, the image including pixels, each pixel having depth data and image value data;
- an image element sets determining circuit that determines a plurality of image element sets, each image element set having a different resolution and at least one image element;
- a plurality of image element buffers, each image element buffer storing one of the determined plurality of image element sets;
- a region of confusion determining circuit;
- a fill color determining circuit;
- an image element color determining circuit; and
- a combining circuit.

31. The defocused image generating system of claim 30, wherein at least one of the first and second model comprises a representation of relative position of the at least one object and the optical system, the defocused image generating system further comprising means for modifying the representation of the relative position, the defocused image generating system generating a new simulated defocused image based on the modified representation of the relative position.

32. The image simulation system of claim 30, wherein the region of confusion determining circuit determines, for each pixel, a region of confusion for that pixel based on at least the depth data for that pixel.

33. The image simulation system of claim 32, wherein the region of confusion determining circuit determines, for each pixel, the region of confusion further based on data corresponding to the characteristics of an optical system.

34. The image simulation system of claim 33, wherein the characteristics of the optical system comprise at least one of an aperture, a focal length, a magnification, and a position relative to a frame of reference corresponding to the depth data.

35. The image simulation system of claim 32, wherein the fill color determining circuit determines, for each pixel, a fill color based on the image value data and a size of the determined region of confusion for that pixel.

36. The image simulation system of claim 30, wherein the image element sets determining circuit determines the resolution of at least one first image element set to be coarser than the pixel resolution.

37. The image simulation system of claim 30, wherein:
- each at least one image element further comprises a size and location and each region of confusion further comprises a location; and
- the image element color determining circuit determines, for at least one image element of at least one image element set, at least one contributing pixel that provides an image value contribution to that image element.

38. The image simulation system of claim 37, wherein the image element color determining circuit determines, for each image element, the at least one contributing pixel based at least on the size of that image element, a size of the region of confusion of each pixel, and relative locations of that image element and each pixel.

39. The image simulation system of claim 30, wherein
- each at least one image element further comprises a size and location, the defocused image comprises a set of output pixels; and
- the combining circuit combines image value data of corresponding image elements of the plurality of element sets to generate the defocused image.

40. The image simulation system of claim 39, wherein the combining circuit determines the image value data for each output pixel of the defocused image by combining the image value data from each image element which overlaps the location of that output pixel.

* * * * *